United States Patent
Condemine

(10) Patent No.: US 7,792,122 B2
(45) Date of Patent: Sep. 7, 2010

(54) TRANSMISSION PROTOCOL AUTOMATIC DETECTION METHOD FOR A PORTABLE OBJECT SUCH AS A CHIP CARD OR A CHIP KEY

(75) Inventor: Olivier Condemine, Paris (FR)

(73) Assignee: Nagra Thomson Licensing, Boulogne-Billancourt (FR)

( * ) Notice: Subject to any disclaimer, the term of this patent is extended or adjusted under 35 U.S.C. 154(b) by 822 days.

(21) Appl. No.: 10/566,451

(22) PCT Filed: Jul. 27, 2004

(86) PCT No.: PCT/EP2004/051621

§ 371 (c)(1),
(2), (4) Date: Feb. 14, 2007

(87) PCT Pub. No.: WO2005/015873

PCT Pub. Date: Feb. 17, 2005

(65) Prior Publication Data

US 2007/0171901 A1    Jul. 26, 2007

(30) Foreign Application Priority Data

Jul. 28, 2003   (EP)   ................................ 03291860

(51) Int. Cl.
  *H04L 12/28* (2006.01)
  *H04L 12/56* (2006.01)
(52) U.S. Cl. .................................... 370/395.5; 370/233
(58) Field of Classification Search ............... 710/8, 710/14, 33, 60; 709/217, 227, 228; 370/252, 370/395.5, 233

See application file for complete search history.

(56) References Cited

U.S. PATENT DOCUMENTS

| 6,065,038 | A  | * | 5/2000 | Chen | ........................ | 709/200 |
| 6,172,609 | B1 | * | 1/2001 | Lu et al. | ................. | 340/572.4 |
| 6,400,759 | B1 | * | 6/2002 | Liu et al. | .................... | 375/222 |

(Continued)

FOREIGN PATENT DOCUMENTS

WO     WO-97/15895        5/1997

(Continued)

OTHER PUBLICATIONS

International Search Report PCT/EP2004/051621 dated Nov. 16, 2004 (3 pages).

(Continued)

*Primary Examiner*—Ayaz R Sheikh
*Assistant Examiner*—Chuong T Ho
(74) *Attorney, Agent, or Firm*—Osha • Liang LLP

(57) ABSTRACT

A method involving a mode for detecting the protocol implemented within and by a portable object. After transmission of a response upon turning on the portable object, an initial signal is received from the interface device. The initial signal is sampled according to at least one of the first and second speeds associated with the first and second respective protocols. In the portable object, at least one sample of a resulting sampling signal is compared to at least one key protocol condition proper to one of the first and second protocols. According to the result of the comparison, the data exchanged according to one of the first or second communication protocols is processed in the portable object.

10 Claims, 1 Drawing Sheet

U.S. PATENT DOCUMENTS

Figure 1:
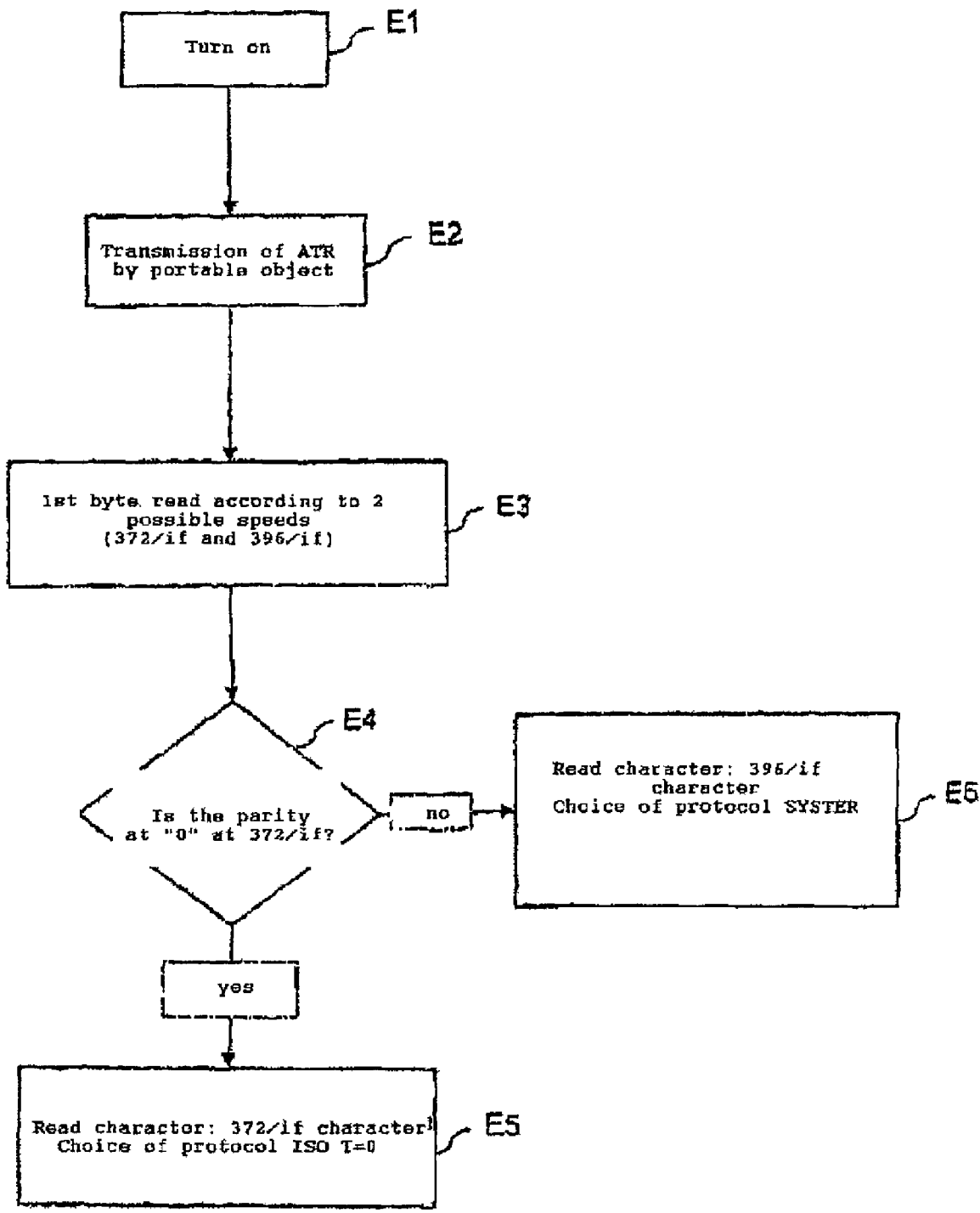

| | | | |
|---|---|---|---|
| 6,678,751 B1 * | 1/2004 | Hays et al. | 710/8 |
| 2001/0007574 A1 * | 7/2001 | Liu et al. | 375/219 |
| 2002/0057703 A1 * | 5/2002 | Sano et al. | 370/402 |

FOREIGN PATENT DOCUMENTS

| | | |
|---|---|---|
| WO | WO-99/17247 | 4/1999 |
| WO | WO-99/49415 | 9/1999 |

OTHER PUBLICATIONS

PCT Written Opinion of the International Searching Authority (PCT Rule 43*bis*.1), dated Jun. 8, 2006, for International Application No. PCT/EP2004/051621 filed Jul. 27, 2004, with English translation (10 pages).

* cited by examiner

TRANSMISSION PROTOCOL AUTOMATIC DETECTION METHOD FOR A PORTABLE OBJECT SUCH AS A CHIP CARD OR A CHIP KEY

The present invention relates to the automatic detection of a transmission protocol for a portable object such as a chip card or a chip key.

BACKGROUND

The invention finds a general application in the exchange of data between a portable object and an interface device and, more particularly, the exchange of data between a receiver/decoder used to descramble scrambled television programs in reception and a portable object of the chip card or chip key type of a subscriber.

Today, the majority of chip cards on the market meet a specific standard, defined particularly in the ISO/CEI 7816-3 and -4 documents. This standard particularly relates to the transmission protocol between the chip card and an interface device with which the card cooperates.

Because of this standard, a multitude of tools and software exist for making interface devices such as chip card readers, control pilots, test and validation tools, machines for customizing cards, etc.

In practice, the standard specifies that the default transmission protocol and the possible other transmission protocols offered by the card are indicated in the interface device through a parameter, called T, that is conveyed in the response of the card when said card is turned on. The standard also provides the possibility for the interface device to select at least one other transmission protocol than that initially retained by the card.

In addition, applications are known such as subscription television, that uses portable chip objects having non-standardized formats, for example, in the form of keys that work according to protocols that are different from those proposed in the standard mentioned above.

For example, such applications concern SYSTER (registered trademark) type analog receivers/decoders deployed, for example, in France to descramble in reception the scrambled television programs.

For such portable chip objects that do not have a standardized protocol format and that are generally produced on a relatively small scale, production costs may be very high.

Furthermore, the testing and integration of such portable chip objects are not facilitated by the fact that no standard tools may be used.

As a matter of fact, the present invention provides a solution to these problems.

SUMMARY

The invention is based on a method for processing data exchanged between a portable object and an interface device.

According to a general definition of the invention, the method comprises a mode for detecting the protocol implemented within and by the portable object in which the following steps are planned:

a. After transmission of a response upon turning on the portable object, an initial signal is received from the interface device;
b. In the portable object, said initial signal is sampled according to at least one of the first and second speeds associated with the first and second respective protocols;
c. In the portable object, at least one sample of a resulting sampling signal is compared to at least one key protocol condition proper to one of the first and second protocols; and
d. According to the result of the comparison, the data exchanged according to one of the first or second communication protocols is processed in the portable object.

Thanks to the method according to the invention, the portable object is capable of managing at least two transmission protocols wherein one is typically standardized according to a desired standard such as the ISO 7816-3 or similar standard, and the other is non-standardized, for example, that of the SYSTER (registered trademark) protocol.

Selection of the type of transmission protocol is done automatically by the portable object during reception of the initial signal transmitted by the interface device, just after the portable object is turned on. The interface device does not make any decision concerning the selection of the transmission protocol. Therefore, if the portable object is in operation mode according to the SYSTER protocol, it will remedy the inability of this SYSTER protocol to manage a switch in operation of the portable object to another ISO type protocol by providing the steps of the method stated above.

The method according to the invention allows very popular standard tools (card readers, customization tools, test tools) to be used, while allowing the portable object to meet a transmission protocol that is different from that in conformance with the ISO standard and specific to a proprietary protocol, such as that proposed by similar SYSTER (registered trademark) type television receivers/decoders.

The method according to the invention supports a specific protocol as well as a standardized protocol without necessarily having to manage the configuration parameters during customization of the portable object. Therefore, there is no impact on the external specifications of the on-board application.

In practice, the portable object is a chip card implementing protocols in conformance with ISO standard 7816-3 or similar (for tests, etc.), and a SYSTER (registered trademark) type communication protocol (for application to digital television).

According to an embodiment, step b) consists of sampling said initial signal according to the first and second speeds while step c) consists of comparing at least one respective sample of each of the two resulting sampling signals to the first and second respective key conditions, each key condition being proper to one of the first and second protocols respectively.

According to another embodiment, step b) consists of sampling the initial signal according to the first speed or the second speed, corresponding respectively to the first and second protocols, in that step c) consists of comparing at least one sample of the resulting sampling signal to one key protocol condition proper to the first protocol, second protocol respectively; and in that step d) consists of processing data exchanged according to the first protocol, second protocol respectively, in case of a positive comparison and according to the second protocol, first protocol respectively, in case of a negative comparison.

According to another characteristic of the invention, the first key condition relates to the parity of the first character sampled at the first speed, while the second key condition relates to the value of the most significant bit of the first character sampled at the second speed.

According to an embodiment, the elementary time unit of the speed in conformance is equal to 372/if where "if" is the initial frequency provided by the interface device, during the response to the portable object being turned on.

According to another embodiment, the elementary time unit of the non-conforming speed is equal to 396/if.

In practice according to a first variation, the initial serial signal is sampled simultaneously according to two speeds. Two samples are therefore performed "in parallel" on the same incoming series signal.

According to another variation, the initial serial signal is sampled according to only one of the two speeds.

The present invention also applies to a portable object able to exchange data with an interface device.

According to another important characteristic of the invention, the portable object comprises means for processing that are able, after transmission of a response to the turning on of the portable object, to receive from the interface device an initial signal; to sample said initial signal according to at least one of the first and second speeds associated with the first and second respective protocols, to compare at least one sample of said initial signal thus sampled according to at least one of said first and second speeds to at least one key protocol condition proper to one of the first and second protocols; and according to the result of the comparison, to process the data thus sampled according to one of the first or second communication protocols.

The present invention also has the object of a computer program stored on an information support comprising instructions for a program allowing the implementation of the processing method mentioned above when the program is loaded and executed by a computer system.

Other characteristics and advantages of the invention will appear in terms of the description detailed below, in which the single FIGURE is a flow chart illustrating an embodiment of the protocol detection method according to the invention.

DETAILED DESCRIPTION OF THE INVENTION

In practice, the transmission protocol detection method according to the invention consists of reading by sampling at least one sample of an initial signal. For example, said at least one sample corresponds to the first byte or character of the initial signal transmitted by the interface device in response to the turning on of the chip card. This said at least one sample is read according to at least one of the speeds wherein one is a speed proper to the protocol of an ISO standard such as the ISO 7816-3 standard or similar, and the other relates to a specific proprietary protocol such as the SYSTER (registered trademark) protocol.

Two variations may be possible.

According to a first variation, sampling the initial signal, for example the first byte received in response to the device being turned on, is planned according to the first and second speeds. The first speed is proper to the first protocol (ISO) and the second speed is proper to the second protocol (SYSTER). These two protocols are associated with two respective speeds because the duration of a bit is distinct according to the protocol that is used.

These two samplings are performed simultaneously on the initial signal that is received in the form of serial bits. The samples obtained at the first speed are placed in a first portion of the memory, in the form of a first sampling signal, and the samples obtained at the second speed are placed in a second portion of the memory, in the form of a first sampling signal.

The method aims to select the protocol according to the samples of the initial signal actually transmitted, the carrying out of such a method is only possible by discrimination of at least one bit, defining a key condition, on the bits of the character carried by the initial signal thus transmitted, whatever the protocol.

The Applicant has observed that the most significant bit of the first character fulfills the function of desired discrimination, that is, here, the parity bit in the case of protocol T=0, conforms to ISO standard 7816-3, and "bit No. 8" in the case of the SYSTER protocol.

In fact, in the SYSTER case, bit No. 8 is at "value 1" as concerns the first character transmitted after a reset of the card to cold or hot.

While in the case of ISO protocol 7816-3, T=0, the parity bit depends on bits $b_0$ to $b_7$, components of the character transmitted. Great autonomy is offered regarding the choice of the value of this first character. This may be either the FF byte in hexadecimal notation, in the case of an initial protocol selection signal according to the ISO standard, or the CLA byte, for instruction class, in the case of an APDU, for "Application Protocol Data Unit," command, that is, the application data protocol.

The Applicant has observed that the FF character is a character whose parity is at the zero state. In other words, the FF byte is compatible with the choice of discrimination. As concerns the choice of the command, choosing a class of appropriate commands whose parity will also be zero is suitable for guaranteeing that the discrimination may be ensured.

In other words, it is agreed that the first command has a compatible class in order to switch the protocol of the card in the desired mode. The following commands may have any class value whatsoever. In fact, one of the functions of this method is to maintain the chosen protocol until the next reset of the card.

The elementary time unit of the initial speed is equal to 372/if, where "if" is the initial frequency provided by the interface device, during the response to the card being turned on (ISO standard 7816-3).

The elementary time unit of the specific speed may be equal to 396/if, where "if" is equal, in the framework of the SYSTER protocol, to approximately 3.8 MHz, for a data rate of approximately 9600 bits per second.

In practice, the values of the elementary time units are not the same for the same frequency, the transmission speed is therefore different according to the interface device. The choice is carried out on the T=0 type ISO protocol, that is, the transmission protocol of asynchronous "half duplex" characters.

With reference to FIG. 1, the operation of the detection protocol according to the first embodiment may be the following:

According to step E1, the portable object is turned on.

According to step E2, the card transmits an ATR (Answer to Reset) response by replying to the powering of the card.

According to step E3, it is expected to read by sampling the first character or byte according to the two possible speeds, or the speed in conformance with the ISO format, or the SYSTER type specific proprietary speed.

According to speed 372/if, that is, the speed in conformance, the parity of the first bit of the first byte is verified (step E4).

If the latter is equal to zero at the speed in conformance, the protocol chosen is that of the ISO protocol corresponding to the T=0 type (step E5).

According to the non-conforming speed, here equal to 396/if, the value of the most significant bit is verified.

If bit No. 8 of the first character is equal to "1", the protocol chosen is that of the specific protocol, for example, here, SYSTER (step E6).

The automatic detection mode of the transmission protocol is here applied to the T=0 type ISO protocol. Of course, this detection mode may be used for other standardized protocols.

In a variation, it is possible to only tolerate a single command class compatible with the discrimination method, in order to give a larger probability of appearance of the specific choice (here SYSTER) and to promote this operation mode.

The method according to the invention allows conventional test and validation tools to be used for chip cards, even with a chip portable object wherein the application tested is not compatible with the standard in force. The method also allows at least two protocols to be managed permanently, without necessitating management of the explicit configuration.

According to a second embodiment, sampling of the initial signal is provided according to only one of the two speeds that is proper to one of the protocols. Then, at least one sample of the resulting sampling signal is compared to a key protocol condition proper to the protocol corresponding to the chosen speed. As a result, data exchanged is processed according to this protocol in case of a positive comparison and according to the other protocol in case of a negative comparison.

According to this second embodiment, it is clear that in case of a negative comparison, that corresponds to the case where the sampling speed does not correspond to the protocol effectively initiated by the interface device, the initial signal data, typically a byte, will not be recovered by the card. But this loss of information of the initial signal in the majority of cases does not disturb the subsequent operation of the portable object in its operation mode according to the protocol to which it will switch following this negative comparison.

When the card is in an ISO 7816-3 standard type interface device, the card meets this standard in full.

The invention does not have any operations requirement. For example, there is no protocol negotiation or impact on the external specifications of the on-board application.

The method according to the invention may be implemented by software stored on a computer support readable by a computer system, possibly completely or partially removable, especially ROM, Flash or EEPROM.

The software comprises instructions from a computer program allowing the implementation of the processing method according to the invention when this program is loaded and executed by a computer system.

What is claimed is:

1. A processing method for data exchanged between a portable object and an interface device, the portable object being of a chip card or chip key type, wherein the method comprises a protocol detection mode implemented within and by the portable object, comprising:
   a) receiving an initial signal from the interface device, wherein the initial signal is received after transmission of a response upon turning on the portable object;
   b) sampling said initial signal simultaneously according to a first speed with a first protocol and a second speed associated with a second protocol in the portable object;
   c) comparing, in the portable object, at least one sample of a resulting sampling signal to at least one key protocol condition corresponding to one of the first protocol and the second protocol; and
   d) processing data exchanged according to one of the first protocol and the second protocol based on a result of the comparison in the portable object;
   wherein an elementary time unit of the first speed is equal to 372/if, where "if" is a frequency provided by the interface device during the response when the portable object is turned on;
   wherein an elementary time unit of the second speed is equal to 396/if, where "if" is the frequency provided by the interface device during the response when the portable object is turned on.

2. The method according to claim 1, wherein step b) consists of sampling said initial signal according to the first speed or the second speed, wherein the first speed corresponds to the first protocol and the second speed corresponds to the second protocol, and wherein step c) consists of comparing the at least one sample of the resulting sampling signal to the key protocol condition according to the first protocol, second protocol respectively if the comparison is a positive comparison, and according to the second protocol, first protocol respectively, if the comparison is a negative comparison.

3. The method according to claim 1, wherein the key protocol condition corresponding to the first protocol relates to the parity of a first bit of a first character of the first protocol.

4. The method according to claim 1, wherein the key protocol condition corresponding to the second protocol relates to a value of a most significant bit of a first character of the second protocol.

5. The method according to claim 1, wherein the portable object is the chip card implementing both a protocol in conformance with ISO standard 7816-3 and a digital television protocol.

6. A portable object able to exchange data with an interface device, wherein the portable object is a chip card or a chip key, and the portable object comprises means for processing configured to:
   receive an initial signal from the interface device;
   sample said initial signal simultaneously according to a first speed associated with a first protocol and a second speed associated with a second protocol;
   compare at least one sample of said initial signal a key protocol conditions- corresponding to the first and second protocols; and
   process data exchanged according to one of the first or the second protocols based on a result of the comparison;
   wherein an elementary time unit of the first speed in equal to 372/if, where "if" is a frequency provided by the interface device during the response when the portable object is turned on;
   wherein an elementary time unit of the first speed is equal to 396/if, where "if" is the frequency provided by the interface device during the response when the portable object is turned on.

7. The portable object according to claim 6, wherein the key protocol condition corresponding to the first protocol relates to the parity of a first bit of a first character of the first protocol.

8. The portable object according to claim 6, wherein the key protocol condition corresponding to the second protocol relates to a value of a most significant bit of a first character of the second protocol.

9. The portable object according to claim 6, wherein the portable object is the chip card implementing both a protocol in conformance with ISO standard 7816-3 and a digital television protocol.

10. A computer readable storage medium comprising program instructions, that when executed by a computing device, allow the implementation of a processing method, comprising:
    receiving an initial signal from the interface device, wherein the initial signal is received after transmission of a response upon turning on the portable object;

sampling said initial signal simultaneously according to a first speed associated with a first protocol and a second speed associated with a second protocol in the portable object;

comparing, in the portable object, at least one sample of a resulting sampling signal to at least one key protocol condition corresponding to one of the first protocol and the second protocol; and processing data exchanged according to one of the first protocol and the second protocol based on the result of the comparison in the portable object;

wherein an elementary time unit of the first speed is equal to 372/if, where "if" is a frequency provided by the interface device during the response when the portable object is turned on;

wherein an elementary time unit of the second speed is equal to 396/if, where "if" is the frequency provided by the interface device during the response when the portable object is turned on.

* * * * *